United States Patent
Widulle

(10) Patent No.: US 10,185,149 B2
(45) Date of Patent: *Jan. 22, 2019

(54) SPECTACLE LENS FOR A DISPLAY DEVICE WHICH CAN BE PLACED ON THE HEAD OF A USER AND WHICH GENERATES AN IMAGE, AND DISPLAY DEVICE COMPRISING SUCH A SPECTACLE LENS

(71) Applicant: Carl Zeiss Smart Optics GmbH, Aalen (DE)

(72) Inventor: Frank Widulle, Neu-Ulm (DE)

(73) Assignee: tooz technologies GmbH, Aalen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/516,001

(22) PCT Filed: Sep. 21, 2015

(86) PCT No.: PCT/EP2015/071592
§ 371 (c)(1),
(2) Date: Mar. 30, 2017

(87) PCT Pub. No.: WO2016/050546
PCT Pub. Date: Apr. 7, 2016

(65) Prior Publication Data
US 2017/0299868 A1    Oct. 19, 2017

(30) Foreign Application Priority Data
Sep. 30, 2014  (DE) .................. 10 2014 114 238

(51) Int. Cl.
*G02C 1/00*    (2006.01)
*G03H 1/00*    (2006.01)
(Continued)

(52) U.S. Cl.
CPC ....... *G02B 27/0172* (2013.01); *G02B 27/017* (2013.01); *G02C 7/086* (2013.01); *G02B 2027/0178* (2013.01)

(58) Field of Classification Search
CPC ............ G02B 27/0172; G02B 27/0101; G02B 27/0149; G02B 27/145; G02B 27/0103;
(Continued)

(56) References Cited

U.S. PATENT DOCUMENTS 8,177,361 B2    5/2012  Sessner et al.
2012/0249899 A1  10/2012  Berthelot et al.
(Continued)

FOREIGN PATENT DOCUMENTS

DE          2657224 A1    6/1978
DE     102011007812 A1   10/2012
(Continued)

OTHER PUBLICATIONS

International Preliminary Report on Patentability rendered by the International Bureau of WIPO for PCT/EP2015/071592, dated Apr. 4, 2017, 14 pages (including English translation).

*Primary Examiner* — Dawayne A Pinkney
(74) *Attorney, Agent, or Firm* — Skaar Ulbrich Macari, P.A.

(57) ABSTRACT

A spectacle lens for a display device can be fitted on the head of a user and generate an image. The spectacle lens includes a coupling-in section, a coupling-out section, and a light guiding channel. The spectacle lens includes a first partial spectacle lens connected to a second partial spectacle lens. The light guiding channel runs in the first partial spectacle lens and the two partial spectacle lenses are connected to each other via contact surfaces which extend on the one hand from the front side to the rear side and on the other hand from the edge of the spectacle lens along a predetermined (Continued)

length in a second direction, which runs transversely with respect to the first direction.

13 Claims, 4 Drawing Sheets

(51) Int. Cl.
    *G02B 27/14* (2006.01)
    *G02F 1/1335* (2006.01)
    *G03B 21/26* (2006.01)
    *G09G 5/00* (2006.01)
    *G02B 27/01* (2006.01)
    *G02C 7/08* (2006.01)

(58) Field of Classification Search
    CPC ......... G02B 27/01; G09F 19/18; G03B 21/00; G03B 21/14; A61B 3/103; A61B 3/14; A61B 3/113; A61B 3/1225; G09G 3/003

USPC ...... 359/630–634, 13–14; 349/11; 310/49 R, 310/156.32–156.35, 266–268, 156.02; 353/11–12, 28, 119; 345/7, 9; 351/200, 351/205–206, 210, 221; 340/438, 980, 340/995.1, 815.47, 815.74

See application file for complete search history.

(56) References Cited

U.S. PATENT DOCUMENTS

2014/0254024 A1   9/2014  Hiraide et al.
2016/0246056 A1   8/2016  Dobschal et al.
2016/0313557 A1* 10/2016 Schmidt ................... G02B 3/08

FOREIGN PATENT DOCUMENTS

WO          2014115260 A1   7/2014
WO    WO 2015044297 A1 * 4/2015 ............... G02B 3/08

\* cited by examiner

SPECTACLE LENS FOR A DISPLAY DEVICE WHICH CAN BE PLACED ON THE HEAD OF A USER AND WHICH GENERATES AN IMAGE, AND DISPLAY DEVICE COMPRISING SUCH A SPECTACLE LENS

PRIORITY

This application claims the benefit of German Patent Application No. 102014114238.1 filed on Sep. 30, 2014, which is hereby incorporated herein by reference in its entirety.

FIELD

The present invention relates to a spectacle lens for a display device that can be fitted on the head of a user and generate an image, and a display device with such a spectacle lens.

BACKGROUND

In a spectacle lens for a display device, the coupling-out section often comprises at least one reflective surface that is buried in the spectacle lens, which leads to the production of such a spectacle lens being complex.

SUMMARY

An object of the present invention is to develop a spectacle lens of the type mentioned at the beginning such that it can be easily produced.

The disclosure includes a spectacle lens constructed in several parts and comprising a first partial spectacle lens and a second partial spectacle lens connected thereto, wherein the light guiding channel runs in the first partial spectacle lens and the two partial spectacle lenses are connected to each other via contact surfaces which extend on the one hand from the front side to the rear side in particular (and thus over the entire thickness of the spectacle lens) and on the other hand from the edge of the spectacle lens along a predetermined length in a second direction, which runs transversely with respect to the first direction.

By means of this construction, the spectacle lens is divided transversely with respect to the first direction with the result that, on the one hand, the coupling-out section can be formed easily in one or in both partial spectacle lenses and, on the other hand, the two partial spectacle lenses can be connected to each other securely and well via the contact surfaces.

In particular, the contact surfaces can be glued or cemented to each other.

The coupling-out section can comprise at least one reflective surface which is formed in the first and/or second partial spectacle lens. The at least one reflective surface is, in particular, a curved surface. Furthermore, the coupling-out section can comprise several reflective surfaces which can also be referred to as reflective facets. The reflective facets can be arranged offset from each other in the manner of a zigzag line or sawtooth line.

The at least one reflective surface can extend from the front side to the rear side of the spectacle lens. However, it is also possible for the at least one reflective surface not to extend over the entire thickness (extent from the front side to the rear side) of the spectacle lens but, for example, only over part thereof. In particular, the reflective surface can be formed as a buried reflective surface with the result that it does not extend to the front side and/or the rear side of the spectacle lens. The reflective surface can extend for example over 20 to 80% of the extent of the spectacle lens from the front side to the rear side. An extension in the range of from 30 to 70% or 40 to 60% of the thickness of the spectacle lens from the front side to the rear side is also possible.

In particular, the coupling-out section can have a beam-deflecting and/or an imaging property.

Regarding the formation of the coupling-out section, in one of the two partial spectacle lenses a recess can be formed and in the other of the two partial spectacle lenses a projecting section which is complementary thereto can be formed. The two partial spectacle lenses can thus be almost plugged together.

At least one of the contact surfaces can extend from the edge of the spectacle lens along the second direction to the coupling-out section. In particular, the two partial spectacle lenses can each comprise two contact surfaces which extend from the edge of the spectacle lens along the second direction to the coupling-out section. In the case of the formation with recess and projecting section, the two contact surfaces can each run from the recess to the edge or from the projecting section to the edge. The two contact surfaces of the first and second partial spectacle lens can in each case lie in one plane. It is also possible for the two contact surfaces of the first or second partial spectacle lens to be offset from each other and/or to be tilted. In particular, the contact surfaces of the partial spectacle lenses are aligned in such a way that, in the assembled spectacle lens, the front side and/or rear side are formed as a continuous surface.

The two partial spectacle lenses can be formed in particular from the same material.

The at least one reflective surface can comprise a reflective coating. Here, a reflectivity of almost 100% can be achieved. However, it is also possible to provide a lower reflectivity with the result that the reflective surface can be used as a partially reflective surface. In addition, it is possible to realize the reflective surface by total internal reflection.

The spectacle lens can comprise precisely two partial spectacle lenses in certain embodiments.

In addition, it is possible for the second direction to extend perpendicularly in the intended use of the spectacle lens.

The light guiding in the light guiding channel can take place, for example, by reflection on the front and rear side of the spectacle lens. This can be total internal reflection or a reflection because of a corresponding partially reflective or reflective coating. However, it is also possible for the guiding to be brought about by means of a reflective layer within the spectacle lens. Here, a reflective layer can be provided so that the front or rear side serves as a further reflective surface. However, two reflective layers spaced apart from each other can also be provided.

Furthermore, a display device with a holder that can be fitted on the head of a user, an image-generating module secured to the holder, which generates an image, and an imaging optical system secured to the holder, which comprises a spectacle lens according to the invention and which, when the holder is fitted on the user's head, images this image such that the user can perceive it as a virtual image, is provided.

The imaging optical system can also comprise the spectacle lens as the only optical element. However, it is also possible for the imaging optical system to comprise, in addition to the spectacle lens, at least one further optical element. The at least one further optical element can, for example, be formed in one piece with one of the two partial spectacle lenses.

The display device can comprise a control unit which controls the image-generating module.

The image-generating module can in particular comprise a two-dimensional imaging system, such as e.g. an LCD module, an LCoS module, an OLED module or a tilting mirror matrix. The imaging system can comprise a plurality of pixels, which can be arranged e.g. in rows and columns. The imaging system can be self-luminous or not self-luminous.

The image-generating module can in particular be formed such that it generates a monochromatic or a multi-coloured image.

The display device according to the invention can comprise further elements known to a person skilled in the art which are necessary for its operation.

It is understood that the features mentioned above and those yet to be explained below can be used not only in the stated combinations but also in other combinations or alone, without departing from the scope of the present invention.

Figure 1:
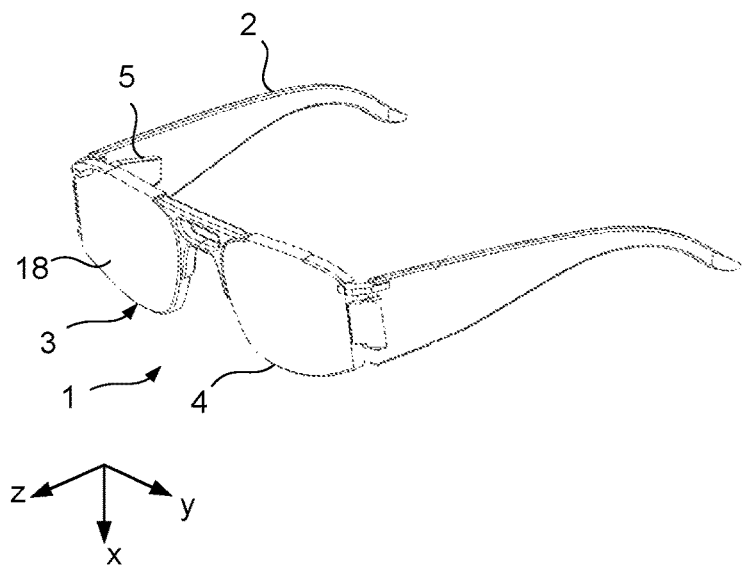
FIG. 1 is a schematic perspective representation of an embodiment of the display device.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various exemplary embodiments. Nevertheless, these embodiments are not intended to limit the present invention to any specific example, environment, application, or particular implementation described herein. Therefore, descriptions of these example embodiments are only provided for purpose of illustration rather than to limit the present invention.

In the embodiment shown in FIG. 1, the display device 1 according to the invention comprises a holder 2 that can be fitted on the head of a user and can be formed e.g. in the manner of a conventional spectacles frame, as well as a first and a second spectacle lens 3, 4, which are secured to the holder 2. The holder 2 with the spectacle lenses 3, 4 can be formed e.g. as sports glasses, sunglasses and/or glasses for correcting defective vision, wherein a virtual image can be reflected into the user's field of view via the first spectacle lens 3, as described below.

For this purpose, the display device 1 comprises an image-generating module 5 which can be arranged in the area of the right-hand temple stem of the holder 2, as is represented schematically in FIG. 1. The image-generating module 5 can comprise a two-dimensional image-generating element 6 (FIG. 2), such as e.g. an OLED, an LCD or an LCoS chip or a tilting mirror matrix, with a plurality of pixels arranged e.g. in rows and columns.

The spectacle lenses 3 and 4, and in particular the first spectacle lens 3, are only described together with the display device 1 according to the invention by way of example. The spectacle lenses 3, 4, or at least the first spectacle lens 3, are in each case formed separately as a spectacle lens 3, 4 according to the invention or as an optical element according to the invention. The optical element according to the invention can also be used in a context other than with the display device 1 described here. Therefore, the optical element, when it is formed as a spectacle lens, can, of course, also be formed as a second spectacle lens 4.

Figure 2:
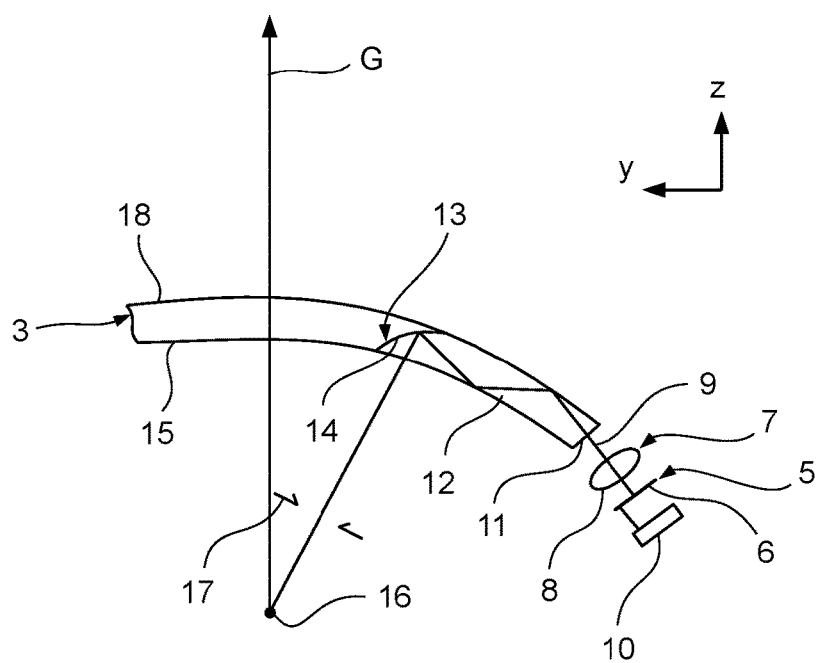
FIG. 2 is an enlarged partial sectional view of the first spectacle lens including a schematic representation of the image-generating module.

As can best be seen from the enlarged schematic partial sectional view in FIG. 2, the display device 1 comprises an imaging optical system 7 which contains an optical element 8 arranged between the image-generating element 6, or the imaging system 6, and the first spectacle lens 3. In addition, the first spectacle lens 3 itself also serves as part of the imaging optical system 7.

A light bundle 9 can emerge from each pixel of the imaging system 6. The desired image can be generated by correspondingly controlling the pixels of the imaging system 6 by means of a control unit 10, which can be part of the image-generating module 5. In FIG. 2, the beam path of a light beam is drawn in to represent the light bundles 9, with the result that the light beam 9 is also discussed below.

The light beam 9 emerging from the imaging system 6 runs through the optical element 8 and enters the first spectacle lens 3 via a coupling-in section 11 and is guided in this along a light guiding channel 12 to a coupling-out section 13. The coupling-out section 13 comprises a reflective deflecting surface 14 on which a reflection of the light beams 9 takes place in the direction of a rear side 15 of the first spectacle lens 3, with the result that the light beams 9 exit the first spectacle lens 3 via the rear side 15.

Thus, when a user is wearing the display device 1 according to the invention on his head as intended, he can perceive the image generated by means of the imaging system 6 as a virtual image when he looks at the coupling-out section 13. In the embodiment described here, the user must look to the right by approx. 40° relative to the direction of view G of a forward view. In FIG. 2, the centre of rotation 16 of the user's eye, as well as the eyebox 17 or the exit pupil 17 of the imaging optical system 7, are drawn in for clarification. The eyebox 17 is the area which is provided by the display device 1 and in which the user's eye can move and he can still always perceive the generated image as a virtual image.

As is shown in the schematic representation in FIG. 2, both the rear side 15 and the front side 18 of the first spectacle lens 3 are formed curved.

The guiding of the light bundles 9 in the light guiding channel 12 can take place e.g. by total internal reflection on the front side 18 and the rear side 15. It is also possible for the front side 18 and/or the rear side 15 to comprise a reflective or partially reflective coating in the area of the light guiding channel in order to bring about the desired light guiding.

Figure 3:
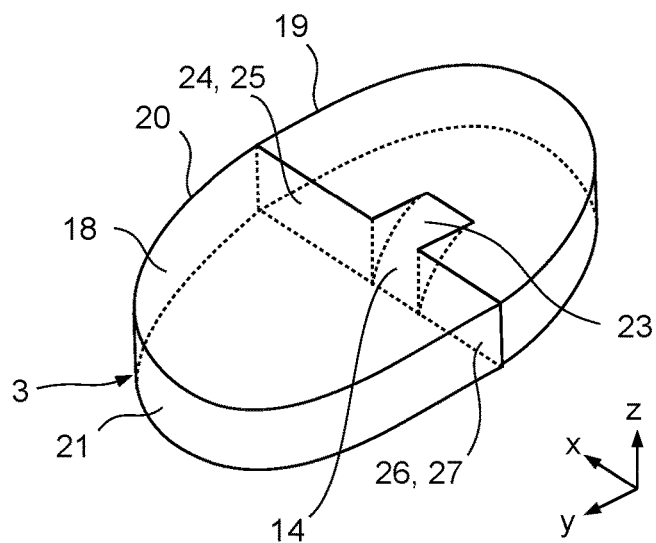
FIG. 3 is a schematic perspective representation of the first spectacle lens.
Figure 4:
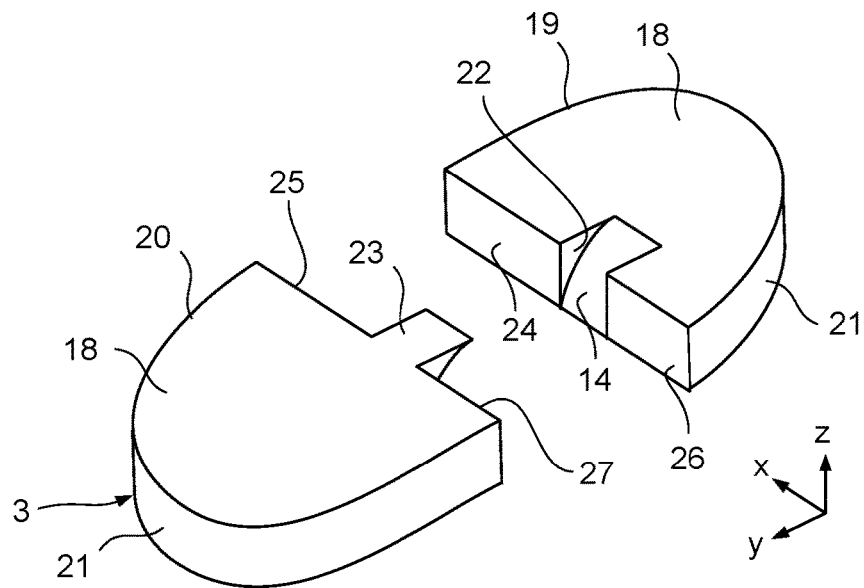
FIG. 4 is a schematic, perspective exploded representation of the first spectacle lens.

As can be learned in particular from the schematic perspective representation of the first spectacle lens 3 in FIG. 3 and the schematic perspective exploded representation of the first spectacle lens 3 in FIG. 4, the first spectacle lens 3 is formed in several parts. In the embodiment described here, the first spectacle lens 3 comprises a first partial spectacle lens 19 and a second partial spectacle lens 20. To simplify the representation, in FIGS. 3 and 4 the front and rear side 18, 15 are shown not curved but flat.

The front and rear side 18, 15 are connected to each other by an edge 21. As can be seen in FIG. 2, the coupling-in of the light bundles 9 takes place via a section 11 of the edge 21. However, it is also possible to couple the light bundles 9 into the first spectacle lens 3 via the rear side 15, for example.

By means of the two-part formation of the first spectacle lens 3, the coupling-out section 13 can be formed in a simple manner. Thus, the shape of the reflective deflecting surface 14 can be formed in the first partial spectacle lens 19 by the recess 22 and the necessary coating can be applied thereto. The first partial spectacle lens 19 can then be connected to the second partial spectacle lens 20 which comprises a projecting section 23 with a complementary shape in the area of the recess 22.

In the embodiment example described here, the light guiding channel 12 is formed completely in the first partial spectacle lens 19 and runs e.g. in the y-direction. The coupled-in light bundles 9 are thus guided in the first partial spectacle lens 19 in the y-direction to the coupling-out section 13 or to the reflective deflecting surface 14.

The first spectacle lens 3 is divided in such a way that the division runs transversely with respect to the first direction and thus in the x-direction. The division extends over the entire extent of the first spectacle lens in the x-direction. Contact surfaces 24 and 25 as well as 26 and 27 facing each other in each case are thus formed on the two partial spectacle lenses 19 and 20. The contact surfaces 24 to 27 are characterized in each case in that they extend over the entire thickness of the first spectacle lens and thus from the front side 18 to the rear side 15 and in that they extend in a direction transversely with respect to the light guiding direction in the light guiding channel 12. The two partial spectacle lenses 19 and 20 can thus be connected by gluing the contact surfaces 24 and 25 as well as 26 and 27 facing each other in each case. Gluing the complementary projecting section 23 to the reflective deflecting surface 14 can thus advantageously be dispensed with. Of course, it is also possible also to glue these two parts of the two partial spectacle lenses 19 and 20 to each other, if this is desired.

The contact surfaces 24 to 27 are characterized in particular in that they extend in each case from the edge 21 of the first spectacle lens 3 in a direction transversely with respect to the light guiding direction in the light guiding channel 12 and thus along the x-direction here. They preferably extend to the reflective deflecting surface 14, as can be seen in FIGS. 3 and 4.

Of course, the recess 22 in the first partial spectacle lens 19 and the projecting section 23 of the second partial spectacle lens 20 can be formed in such a way that, in the assembled state, an air gap is present between them. In this case, the coupling-out can take place via the coupling-out section 13 by total internal reflection.

Figure 5:
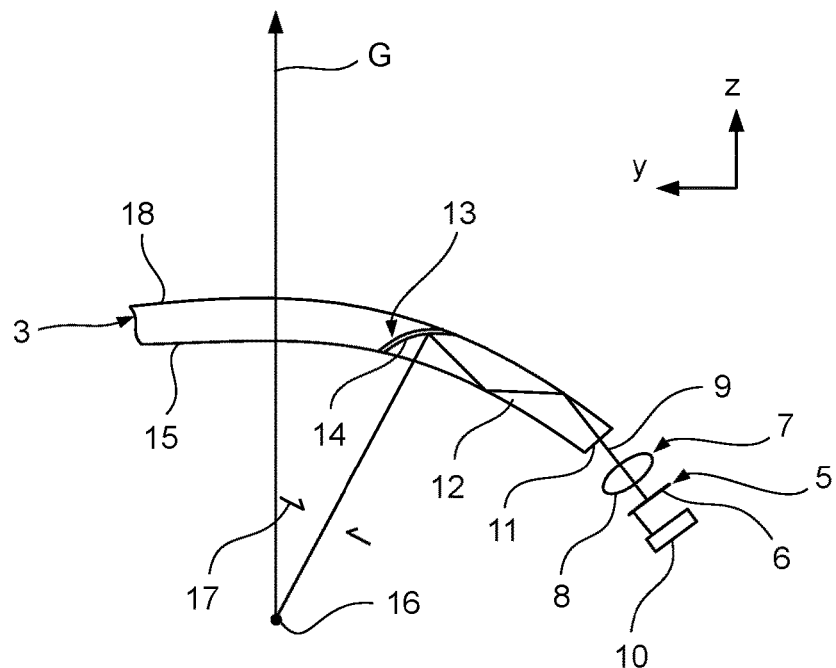
FIG. 5 is an enlarged partial sectional view of the first spectacle lens including a schematic representation of the image-generating module according to a further embodiment.

Such an embodiment with an air gap is shown schematically in FIG. 5 in a sectional representation according to FIG. 2. The sectional representation in FIGS. 2 and 5 is chosen such that the section runs through the reflective deflecting surface 14.

Figure 6:
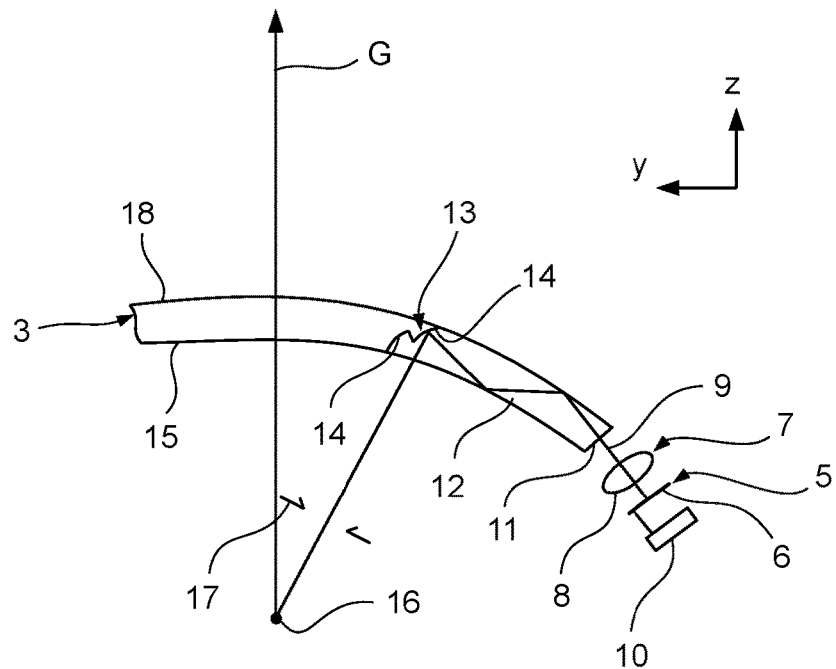
FIG. 6 is an enlarged partial sectional view of the first spectacle lens including a schematic representation of the image-generating module according to a further embodiment.

In addition, it is possible to form the recess 22 in such a way that several deflecting surfaces 14 arranged next to each other, which can also be referred to as reflective facets, are provided. A corresponding representation is shown in FIG. 6. It is possible for both the recess 22 and the projecting section 23 to be formed correspondingly, as is shown in the sectional representation in FIG. 6.

Figure 7:
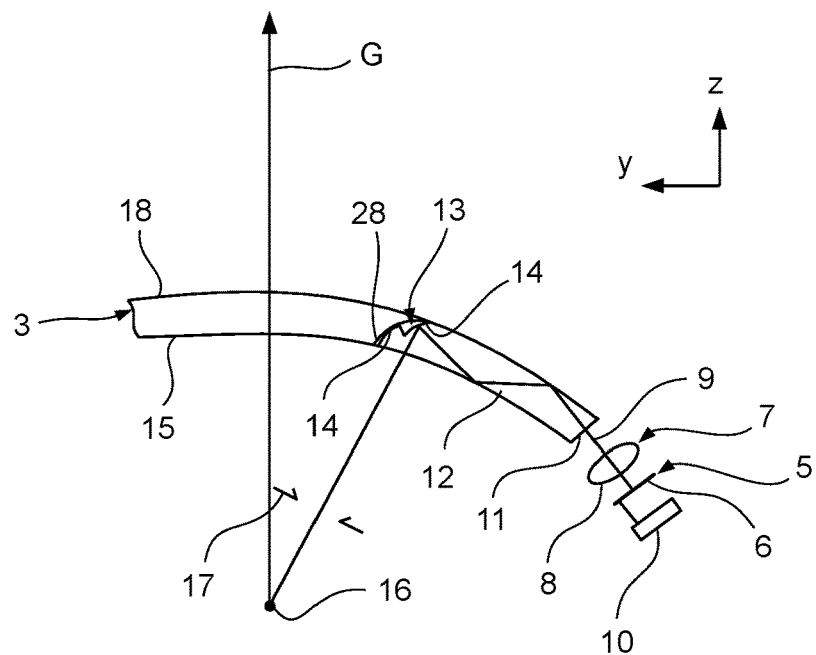
FIG. 7 is an enlarged partial sectional view of the first spectacle lens including a schematic representation of the image-generating module according to a further embodiment.

Furthermore, it is possible to provide the several reflective deflecting surfaces 14 only in the recess 22 and then to form the latter with a smooth upper side with the result that the projecting section 23 can be formed as in the embodiment according to FIGS. 3 and 4. A corresponding sectional representation is shown in FIG. 7. The line 28 indicates the smooth underside of the projecting section 23. If the reflective deflecting surfaces 14 in the recess 22 are filled with the same material as that of the second spectacle partial body 20, in order to form the smooth upper side, the line 28 in the sectional representation is not visible.

The contact surfaces 24 and 26 preferably lie in the same plane. However, they can also be offset from each other and/or tilted with respect to each other. The same applies to the contact surfaces 25 and 27.

Figure 8:
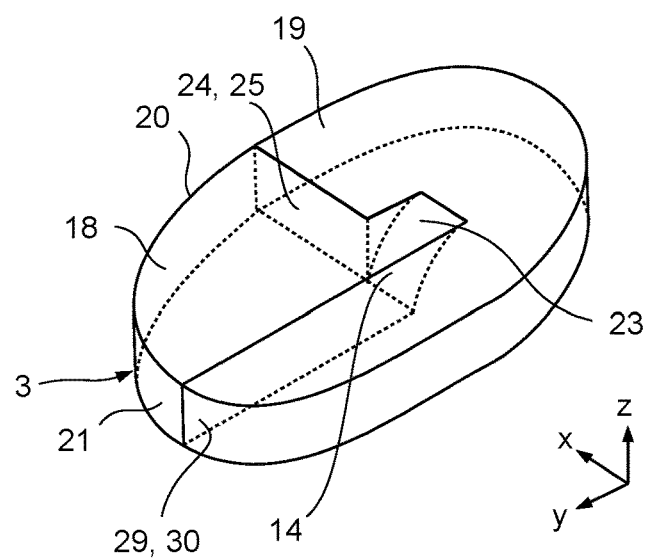
FIG. 8 is a schematic perspective representation of the first spectacle lens according to a further embodiment.

In FIG. 8, a further embodiment of the first spectacle lens 3 according to the invention is shown. This embodiment differs from the embodiments described hitherto in that, instead of the two contact surfaces 26 and 27, the contact surfaces 29 and 30 are provided, which extend from the edge 21 of the first spectacle lens 3 along the direction of the light guiding in the light guiding channel 12 and thus along the y-direction. Thus, in this case, the first partial spectacle lens 19 is formed essentially L-shaped and the second partial spectacle lens 20 essentially has a quadrant shape or a quarter of an ellipse with the result that the assembled spectacle lens 3 has the same shape as previously. The contact surfaces 29 and 30 can, in turn, be glued to each other. The important thing in this embodiment is that the contact surfaces 24 and 25 extend from the edge 21 in a direction transversely with respect to the light guiding direction and thus along the x-direction.

In a modification, not shown, the second partial spectacle lens can be formed essentially L-shaped and the first partial spectacle lens 19 can have the shape of a quadrant or a quarter ellipse.

The contact surfaces 29 and 30 do not have to extend along the y-direction but can also have other directions. Essentially, it is preferred for the assembled first spectacle lens 3 to have a continuous front and rear side 18, 15 made of the two partial spectacle lenses 19 and 20.

The materials of the two partial spectacle lenses 19 and 20 are preferably the same, with the result that they have an identical refractive index.

In the display device 1 according to the invention, the reflection of the virtual image into the user's field of view takes place via the first spectacle lens 3. Of course, a reflection via the second spectacle lens 4 is also possible. In addition, the display device 1 can be formed such that items of information or virtual images are reflected via both spectacle lenses 3, 4. The reflection can take place such that a three-dimensional image impression results. However, this is not absolutely necessary.

The spectacle lenses 3, 4 can have a refractive power of zero or a refractive power different from zero (in particular to correct defective vision). As is shown in the figures, both the front side 18 and the rear side 15 are formed curved. The front side 18 is in particular spherically curved. If the spectacle lens 3, 4 has a refractive power different from zero, in order to correct defective vision, as a rule the curvature of the rear side 15 is chosen appropriately in order to achieve the appropriate correction. The rear side 15 can have a curvature which deviates from the spherical form.

The holder 2 does not have to be formed as a spectacles-type holder. Any other type of holder with which the display device can be fitted and worn on the head is also possible.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

The invention claimed is:

1. A spectacle lens for a display device that can be fitted on the head of a user and generate an image, the spectacle lens defining a front side, a rear side and an edge connecting the front and rear side, the spectacle lens comprising:
   a coupling-in section;
   a coupling-out section spaced apart from the coupling-in section; and
   a light guiding channel configured to guide light bundles of pixels of the generated image, which are coupled into the spectacle lens via the coupling-in section of the spectacle lens, in the spectacle lens along a first direction to the coupling-out section, by which they are coupled out of the spectacle lens,
   wherein the spectacle lens comprises several parts, including a first partial spectacle lens and a second partial spectacle lens connected together,
   wherein the light guiding channel runs in the first partial spectacle lens, and
   wherein the first and second partial spectacle lenses are connected to each other via contact surfaces which extend on the one hand from the front side to the rear side and on the other hand from the edge of the spectacle lens along a predetermined length in a second direction, which runs transversely with respect to the first direction.

2. The spectacle lens according to claim 1, wherein the coupling-out section comprises at least one reflective surface which is formed in the first partial spectacle lens.

3. The spectacle lens according to claim 2, wherein the coupling-out section comprises at least one reflective surface which is formed in the second partial spectacle lens.

4. The spectacle lens according to claim 3, wherein the at least one reflective surface is formed curved.

5. The spectacle lens according to claim 2, wherein the at least one reflective surface is formed curved.

6. The spectacle lens according to claim 1, wherein the coupling-out section comprises at least one reflective surface which is formed in the second partial spectacle lens.

7. The spectacle lens according to claim 6, wherein the at least one reflective surface is formed curved.

8. The spectacle lens according to claim 1, wherein, the coupling-out section comprises, in one of the first and second partial spectacle lenses, a recess and in the other of the first and second partial spectacle lenses a projecting section which is complementary to the recess.

9. The spectacle lens according to claim 1, wherein at least one of the contact surfaces extends from the edge of the spectacle lens to the coupling-out section.

10. The spectacle lens according to claim 1, wherein the first and second partial spectacle lenses each comprise two contact surfaces which extend from the edge of the spectacle lens to the coupling-out section.

11. The spectacle lens according to claim 10, wherein the two contact surfaces of the first and second partial spectacle lens in each case lie in one plane.

12. The spectacle lens according to claim 1, wherein the two partial spectacle lenses comprise the same material.

13. A display device, comprising:
   a holder that can be fitted on the head of a user,
   an image-generating module secured to the holder, which generates an image, and
   an imaging optical system secured to the holder, which comprises a spectacle lens according to claim 1, and when the holder is fitted on the user's head, images the generated image such that the user can perceive it as a virtual image.

* * * * *